(12) United States Patent
Papadopolo et al.

(10) Patent No.: US 8,620,576 B1
(45) Date of Patent: Dec. 31, 2013

(54) PRODUCT LOCATION NAVIGATION

(75) Inventors: Alex Papadopolo, Denville, NJ (US);
Derek Andrew Schroeder, Caldwell, NJ (US); Jennifer Schmid, Toms River, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 459 days.

(21) Appl. No.: 12/897,386

(22) Filed: Oct. 4, 2010

(51) Int. Cl.
*G01C 21/00* (2006.01)

(52) U.S. Cl.
USPC .......................................................... 701/410

(58) Field of Classification Search
None
See application file for complete search history.

(56) References Cited

U.S. PATENT DOCUMENTS

| | | | |
|---|---|---|---|
| 7,200,387 B1 | 4/2007 | Ephraim et al. | |
| 8,106,819 B1 * | 1/2012 | Rahman et al. | 342/357.4 |
| 8,264,403 B2 * | 9/2012 | Rahman et al. | 342/357.4 |
| 2008/0167001 A1 * | 7/2008 | Wong | 455/411 |
| 2009/0106124 A1 * | 4/2009 | Yang | 705/26 |
| 2009/0313109 A1 | 12/2009 | Bous et al. | |
| 2010/0061528 A1 * | 3/2010 | Cohen et al. | 379/88.04 |
| 2012/0169534 A1 * | 7/2012 | Rahman et al. | 342/357.42 |

OTHER PUBLICATIONS

"Popular Mobile Couponing App. Yowza!! Co-Created by Heroe's Star, Greg Grunberg, Launches Yowza!! Version 2.0 with Advanced Features and More Retail Partners", downloaded Nov. 24, 2010 from https://getyowza.com/pr/releases/2009/09/1.

* cited by examiner

*Primary Examiner* — Thomas Tarcza
*Assistant Examiner* — Adam Alharbi

(57) ABSTRACT

The exemplary technologies can automatically offer customer directions for navigating to a store, having a desired product in stock, on the customer's mobile station, for example, turn-by-turn directions from a store that does not have the customer-desired product to an affiliated store that has the product in stock.

17 Claims, 3 Drawing Sheets

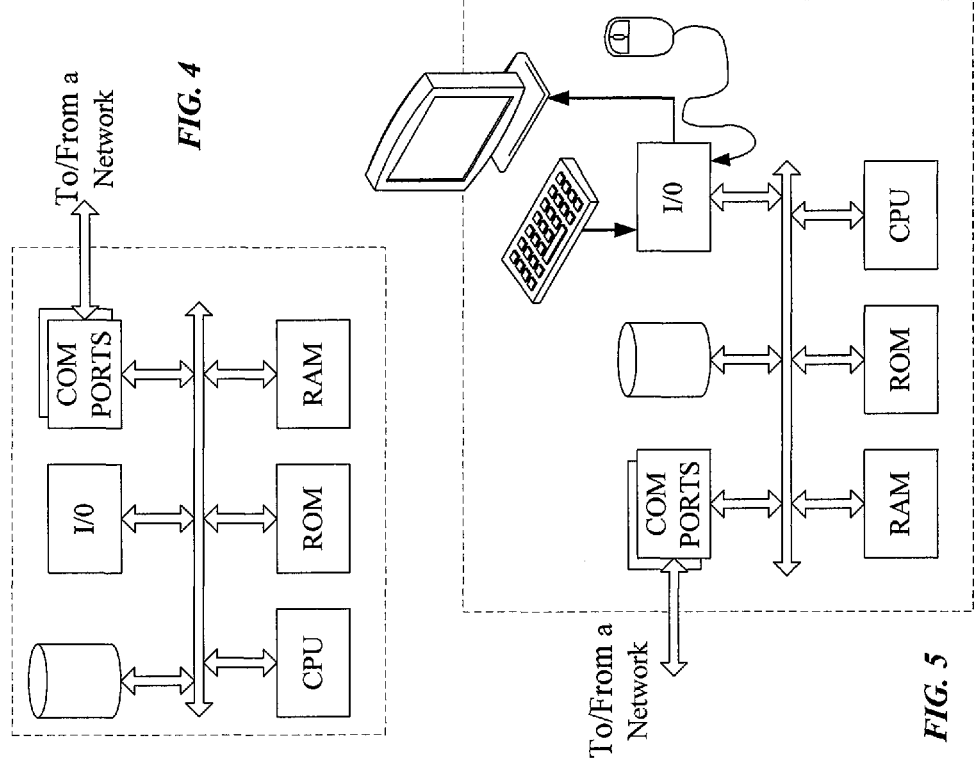
FIG. 4
FIG. 5
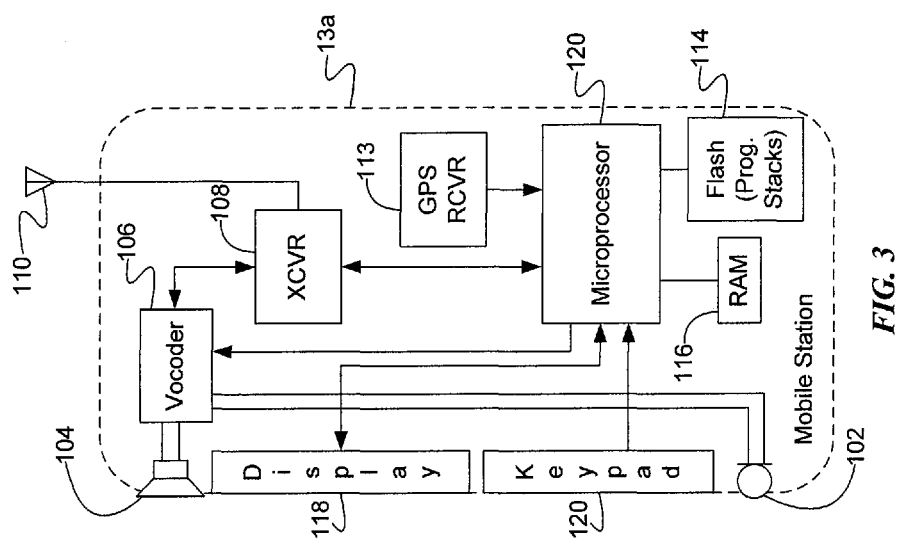
FIG. 3

PRODUCT LOCATION NAVIGATION

TECHNICAL FIELD

The present subject matter relates to techniques and equipments to automatically provide directions on a mobile station of a customer to the location of a store that has a desired product not available in the first store.

BACKGROUND

Many situations arise today where a customer seeking to buy a particular product in a store discovers that the particular store does not have the desired product. However, to make the sale and satisfy the customer, a representative of the store will search an inventory management database of the store operator to determine if another store within a reasonable distance has the desired product in stock. If so, the customer may be willing to travel to the other store to purchase and/or pickup the available product.

In these situations, it is desirable to provide directions from the store where the product is not available to the one that has the product, to make it easy and convenient for the customer to travel from one store to another. For example, the representative may obtain and print directions to the other store, e.g. from an on-line service, and provide them to the customer. In other scenarios, a potential customer may go on-line to research and identify a store having a desired product and then obtain directions to the store for printout, for example, from a retailer's website or from a mapping service website. However, printed directions are not always convenient to use, for example, to read in real time as the customer drives a vehicle herself to the second store.

SUMMARY

The teachings herein alleviate one or more of the above noted problems with helping a customer to navigate to a selected store, having a desired product in stock.

An exemplary method for the specific store-to-store navigation problem might involve receiving an input of a product selection of a customer via a point of sale terminal in a first store, for example, in the store where a product desired by the customer is unavailable. In response to the product selection, an inventory management system is searched to identify one or more stores having the selected product in stock. The method also involves selection of a second store from among the one or more identified stores. A place message, relating to location of the second store, is sent for a mobile station of the customer. The place message triggers a step of waking up a navigation client application on the mobile station of the customer, to obtain information regarding the location of the selected second store via a mobile communication network. This offers the capability to provide directions for the customer from a current location of the mobile station of the customer to the location of the selected second store, for presentation to the customer, via the navigation client application and a user interface of the mobile station.

Other concepts relate to unique systems and software for implementing the technique to automatically provide directions to the second store, for the customer, via the customer's mobile station.

The exemplary technologies may offer one or more advantages. For example, the method of automatically providing directions to the store having the product increases the likelihood that the customer will purchase an item that was out-of-stock in the first store. The automated navigation may also provide an enhanced great customer experience in a potentiality negative situation where the customer otherwise would go away dissatisfied with the store not having the product. The method of automatically providing directions to the store having the product also may reduce the amount of time the store representative takes to get a customer to the store with the item in stock, which increases productivity. In a more specific example where the store is one operated by or in association with the provider of services through the mobile communication network, the experience may also promote usage of a navigation service/feature offered by that provider via the innovative solution to the store-to-store navigation problem.

The exemplary technologies also may offer one or more similar advantages in situations where the customer selects the product and possibly the particular store via some other type of system, instead of via a first store. For example, the customer may select the product via a call to an interactive voice response system. As another example, the customer may identify a product from a retailer's website and request information about one or more stores in the vicinity having the desired product. In scenarios like these, the product selection may also offer the ability to initiate a place message, etc., to provide the automatic navigation directions to the selected store having the product for presentation on the customer's mobile station.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 is a functional block diagram of a mobile station.

FIG. 4 is a simplified functional block diagram of a computer that may be configured as a host or server, for example, to function as the CCES middleware, the Navigation ASP or the POS inventory management system in the system of FIG. 2.

FIG. 5 is a simplified functional block diagram of a personal computer or other work station or terminal device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods, systems and programming disclosed herein relate to automatically providing directions to the store having the product in stock. From a point of sale in a store not having the product in stock, for example, the system allows a search of the inventory in nearby stores and may allow the customer to choose a store with the product in stock to make the purchase. A place message is sent for the customer's mobile station that enables the station to obtain turn-by-turn navigation directions to the store having the product, for presentation to the customer via the user interface of the mobile station.

Figure 1:
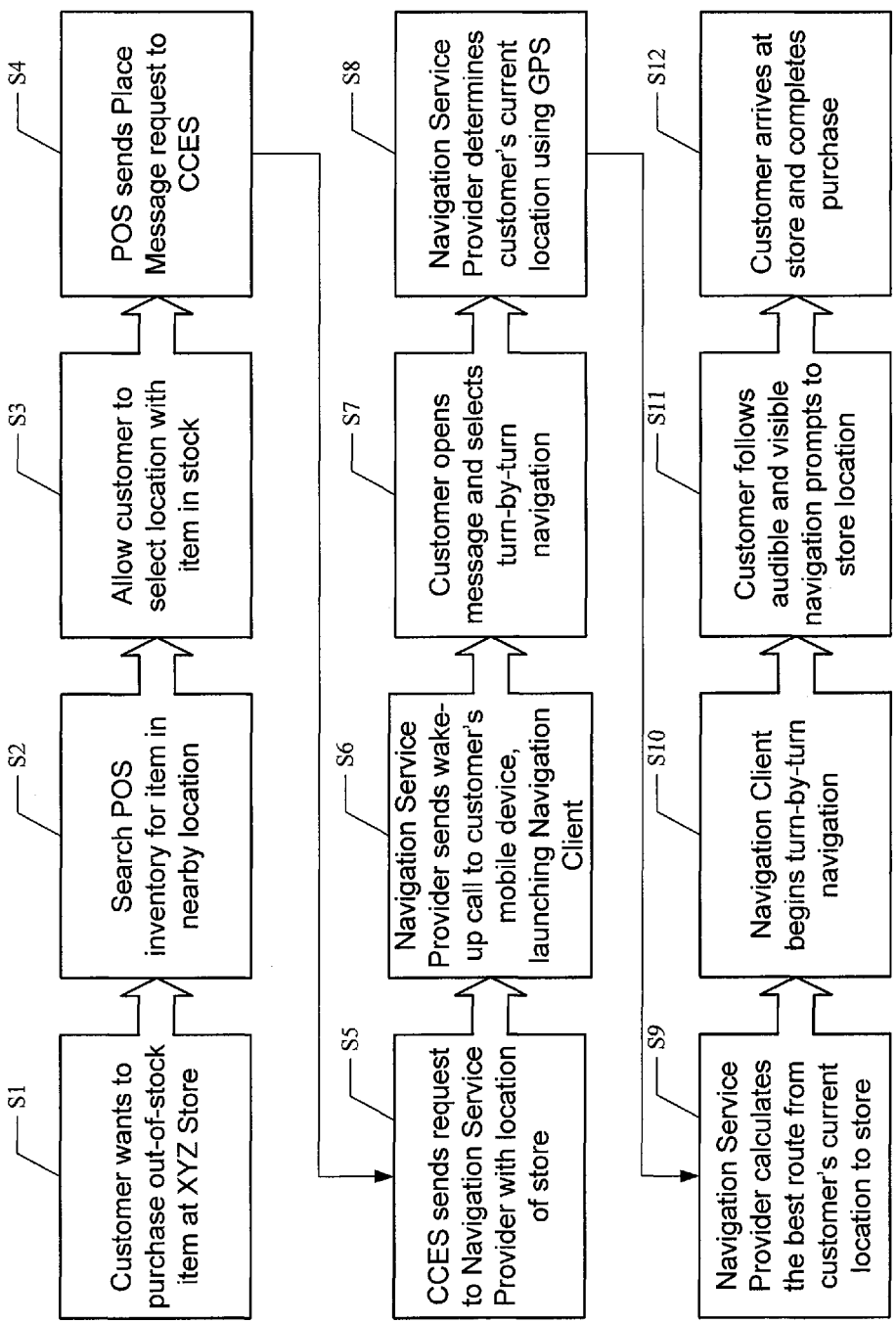
FIG. 1 is a block diagram, high level, type flow chart illustrating an example of a procedure for automatically providing directions to a store where a desired product is available, for the customer, via the customer's mobile station.

Reference now is made in detail to the examples illustrated in the accompanying drawings and discussed below. FIG. 1 is a block diagram, high level, type flow chart illustrating an example of a procedure for automatically providing directions to a store where a desired product is available, for the customer, via the customer's mobile station. The procedure begins with the customer wanting to purchase out-of-stock item at a store (S1). To this end, the customer may visit the store of a mobile service provider such as, for example, the store of XYZ Mobile, and can talk to a customer representative at the store to identify the particular out-of-stock item and the nearest store carrying the particular out-of-stock item. The representative can search the inventory by store location so that the customer can obtain the out-of-stock product from the closest or otherwise most convenient store location where the desired product is available. In a slightly different implementation, instead of the representative performing the search, the customer may interact directly with a point of sale computer within the store to identify a location for the out-of-stock item at the store.

In either case, responsive to the customer's request for the particular out-of-stock item, a search of point of sales inventory for the selected item in nearby locations is performed to identify one or more stores having the selected product in stock (S2). The result of the search is displayed to the user. In a scenario in which one or more stores have the selected product in stock, the list of stores carrying the product may be displayed to the user in an ascending order by distance, for example. This allows the customer to select the location with the item in stock (S3). The customer may select the location of the store closest to the current position of the customer. Alternatively, the customer may select the location of the store closest to the customer's home or place of work.

In response to the customer's selection, the point of sale computer operated by the customer or the store representative sends a place message to a Customer Care Enterprise Solution (CCES) server. The place message includes information relating to location of the selected store. The place message is identified as a message for a mobile station of the customer (S4). The CCES server receives the place message and in response generates and sends a request to a system of a navigation service provider with the location of the store (S5). In response, the system of the navigation service provider sends through the mobile communication network a wake-up message to the customer mobile device, launching the navigation client (S6). In one specific example, the wake-up message is a particular SMS message that once received by the mobile device wakes-up the navigation client application stored in the mobile device. Upon wake-up, the navigation client application may glean from the payload of the wake-up message instructions to contact the navigation service provider. This causes the mobile device to communicate through the mobile communication network with the system of the navigation service provider to obtain the place message (e.g., the location of the selected store) for the mobile device.

In this manner, the navigation client application obtains the place message and enables the customer to select turn-by-turn navigation to the location of the selected store (S7). For example, upon downloading the place message, the navigation application may display to the customer a user interface providing a variety of options including, for example, including turn-by-turn navigation to the location of the selected store carrying the out-of-stock item. In response to selecting the turn-by-turn navigation, the customer is presented with the turn-by-turn directions via the navigation client application and a user interface of the mobile from a current location of the mobile device to the location of the selected second store.

To provide directions to the customer, in one implementation, the navigation service provider determines the customer's current location using GPS implemented at least in part on the mobile station (S8). The navigation service provider then calculates the best route from the customer's current location to the selected store (S9). Thereafter, the navigation service provider provides the turn-by-turn navigation directions to the navigation client of the mobile device which begins presenting the turn-by-turn navigation directions to the customer/user of the mobile station (S10). The customer follows audible and visible navigation prompts to the store location (S11), and the customer arrives at the store and completes the purchase (S12). This procedure can increase the likelihood that the customer will purchase an out-of-stock item. It can provide a better customer experience in a potentially negative situation. Additionally, it can reduce the amount of time the store representative takes to get a customer to the store with the item in stock, which in turn can increase the productivity.

Figure 2:
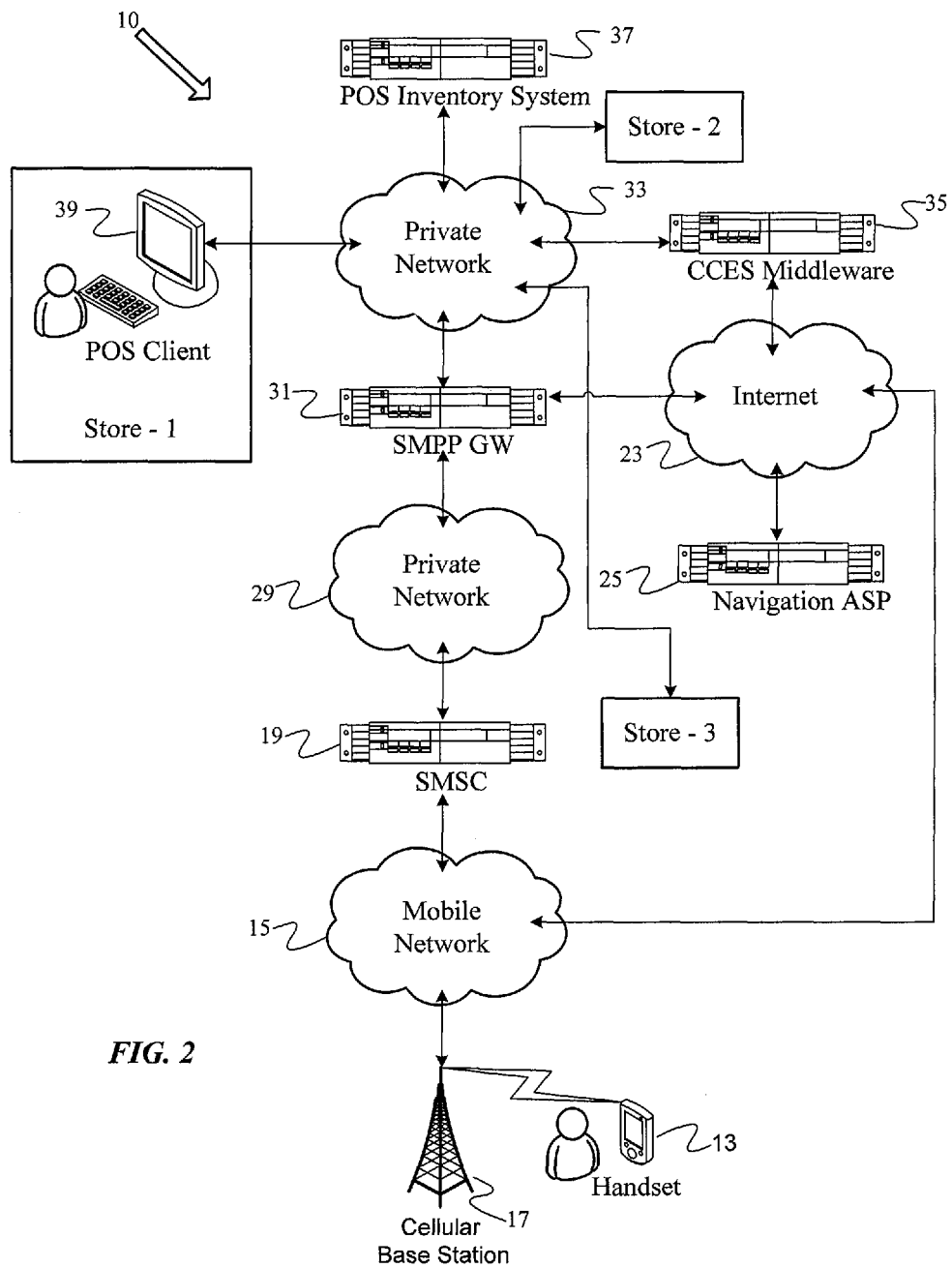
FIG. 2 is a functional block diagram of a network and systems that may implement a procedure like that of FIG. 1.

FIG. 2 illustrates a system 10 offering a variety of mobile communication services, including communications that enable a procedure like that of FIG. 1. The example shows simply a mobile station (MS) 13 as well as a mobile communication network 15. The station 13 is an example of a mobile station that may be used for automatically providing directions to a store where a desired out-of-stock product is available. However, the network will provide similar communications for many other similar users as well as for mobile devices/users that do not participate in locating particular out-of-stock products. The network 15 provides mobile wireless communications services to the mobile station 13 as well as to other mobile stations (not shown), for example, via a base station (BS) 17 one of which is shown in the drawing for convenience. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile station 13 may be capable of voice telephone communications through the network 15. The mobile station 13 may also be capable of data communications through the particular type of network 15 (and the users thereof typically will have subscribed to data service through the network).

The network 15 allows the user of the mobile station 13 (and other mobile stations not shown) to initiate and receive telephone calls to each other. The network 15 typically offers a variety of data services via the Internet 23, such as downloads, web browsing, email, etc. By way of example, the drawing shows a server 25 connected to the Internet 23, which as discussed more later, is a server system of a navigation application service provider "ASP." The data services for the mobile station 13 via the Internet 23 may be with devices like server 25 as well as with a variety of other types of devices or systems capable of data communications through various interconnected networks. The server 25 corresponds to the navigation provider service, which is capable of providing navigation service to mobile station 13 via the communication network and through the navigation client operational at mobile station 13.

Mobile station 13 can take the form of portable handsets, smart-phones or personal digital assistants, although they may be implemented in other form factors. Program applications, including an application to assist in navigation service and/or any an application purchased via on-line can be configured to execute on many different types of mobile stations. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile station 13, can include one or more RANs and a regional circuit and/or packet switched network and associated signaling network facilities.

Physical elements of a RAN operated by one of the mobile service providers or carriers, include a number of base stations represented in the example by BS17. Although not separately shown, such BS17 can include a base transceiver system (BTS,) which can communicate via an antennae system at the site of base station and over the airlink with one or more of the mobile stations (e.g., mobile station 13), when the mobile stations are within range. Each base station can include a BTS coupled to several antennae mounted on a radio tower within a coverage area often referred to as a "cell." The BTS is the part of the radio network that sends and receives RF signals to/from the mobile stations that are served by the BS17.

The radio access networks can also include a traffic network represented generally by the cloud at 15, which carries the user communications and data for the mobile station 13 between BS17 and other elements with or through which the mobile stations communicate. The network can also include other elements that support functionality other than data services the navigation service, such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29, 33 (sometimes referred to as an Intranet), i.e., a private networks. Generally, such systems are part of or connected for communication via the private networks 29, 33. A person skilled in the art, however, would recognize that systems outside of the private network could serve the same functions as well.

A mobile station 13 communicates over the air with BS17 and through the traffic network 15 for various voice and data communications, e.g. through the Internet 23 with a server 25 of the navigation ASP. Alternatively or additionally, the mobile station 13 communicates with the server 25 of the navigation ASP through SMPP gateway 21, private network 29, SMSC 19, and mobile network 15. The navigation ASP server 25 enables turn-by-turn navigation on the mobile station 13. In keeping with the previous example described with respect to FIG. 1, the mobile station includes a navigation client which interacts with the navigation provider server 25 to obtain the place message for automatically locating one or more stores that include the out-of-stock item not available in store 1, for example.

If the mobile service carrier offers the service for automatically locating one or more stores carrying out-of-stock items, the service may be hosted on a carrier operated navigation ASP server 25, for communication via the networks 15, 23, and 29. To illustrate one specific example, the customer carrying mobile station 13 may visit a point of sale, which may refer to channels that sell products (e.g., mobile phones) of the mobile service provider to the customer. In the illustrated example, the point of sale is a terminal 39 at store 1 of a mobile service provider such as, for example, XYZ Mobile. The customer may talk to a customer representative or may interact directly with terminal 39 at the store to identify the particular out-of-stock item and the nearest store carrying the particular out-of-stock item. Alternatively, the terminal might be a user's PC or even a mobile station, where the customer can access on-line store related information.

For either of the in-store examples, upon entry of the request for out-of-stock item into the terminal 39, terminal 39 search POS inventory system 37 via the private network 37 to identify one or more stores (e.g., stores 2 and 3) having the selected product, which is out-of-stock in store 1, in stock. The POS inventory system 37 in turn searches the stores of the mobile service provider via the private network 37 to identify which of the stores (e.g., stores 2 and 3) carry the item that is out-of-stock in store 1. The result of the search is displayed to the user on terminal 39. In a scenario in which one or more stores (e.g., stores 2 and 3) have the selected product in stock, the list of stores carrying the product may be displayed to the user on terminal 39. This allows the customer to select the store carrying the out-of-stock item in store 1 that is most convenient from the customer's perspective. Upon selecting the store (e.g., store 2), the terminal 39 sends a place message to CCES server 35, requesting the location/direction service with respect to the selected store (e.g., store 2), for the mobile station 13 of the customer.

The CCES server 35 is implemented as an enterprise middleware web service written in Java that receives notification requests in the form of FTP and XML via HTTP, and follows business rules to send customer notifications and update systems of record. In general, these communications may utilize the CCES web services to facilitate the sending of text message, E-mail, letter, and fax notifications. Hence, CCES server 35 may be implemented as middleware, that is to say, in this example, as software for enabling the identification of the stores carrying the out-of-stock item. Although shown as a common platform at 35 in FIG. 2, the elements of the CCES server 35 of FIG. 2 may be implemented on separate hardware communicating with each other via a network the same as or similar to network 33.

Once the CCES server 35 receives the place message from the terminal 39, the CCES server 35 identifies the location of the selected store (e.g., store 2) and generates and sends a request to the navigation provider server 25 with the location of the selected store. In response, the navigation provider server 25 sends through networks 23, 29 a wake-up message to the mobile station 13, launching the navigation client on the mobile station 13. The wake-up message may be in the be a special form of SMS designed to wake-up an application on a mobile station, in this case, the navigation client stored on the mobile station 13.

Wireless carriers developed SMS to transmit text messages for display on the mobile stations. In many existing network architectures, the SMS traffic uses the signaling portion of the network 15 to carry message traffic between a Short Message Service Center (SMSC) 19 and the mobile stations. The SMSC supports mobile station to mobile station delivery of text messages. However, the SMSC also supports communication of messages between the mobile stations and devices coupled to other networks. For example, the SMSC 19 may receive incoming IP message packets from the Internet 23 for delivery via the network 15, one of the base stations 17 and a signaling channel over the air link to a destination mobile station. For this later type of SMS related communications, the network 10 also includes one or more Short Message Peer-to-Peer (SMPP) protocol gateways 31. The SMPP gateway provides protocol conversions, between SMPP as used by the SMSC 19 and the protocols used on the Internet 23 or other IP network. SMPP messages ride on IP transport, e.g. between the gateway 31 and the SMSC 19. In this case, the navigation ASP server sends the wake up message through the Internet 23 to the SMPP gateway 31. After appropriate conversion, the gateway 31 forwards the message to the SMSC 19, for delivery to the mobile station 13 via the network 15 and the serving base station 17. Upon receipt, the mobile station recognizes the particular type of SMS message as a message to wake up an identified application, in this case the navigation client application. Hence, upon receipt, the mobile station will wake up the navigation client application.

Upon wake-up, the navigation client application may glean from the payload of the wake-up message instructions to contact the navigation ASP server 25. This causes the mobile station 13 to communicate through the mobile communication network 15 with the system of the navigation ASP server 25 to obtain the place message (e.g., the location of the selected store 2) for the mobile station 13. In this manner, the navigation client application obtains the place message and enables the customer to select turn-by-turn navigation to the location of the selected store 2. For example, upon downloading the place message, the navigation application may display on mobile station 13 a user interface providing a variety of options including, for example, turn-by-turn navigation to the location of the store 2 carrying the out-of-stock item. In response to user selection of the turn-by-turn navigation, the customer is presented with the turn-by-turn directions via the navigation client application and the user interface of the mobile from a current location of the mobile device to the location of the selected second store.

The discussion above has focused on an example in which the customer selected the product in a store. However, the automated navigation to the selected store having the desired product may offer similar advantages in situations where the customer selects the product and possibly the particular store via some other type of system. For example, the customer may select the product via a call to an interactive voice response (IVR) system. As another example, the customer may identify a product from a retailer's website and request information about one or more stores in the vicinity having the desired product. In scenarios like these, the product selection may also offer the ability to initiate a place message, etc., to provide the automatic navigation directions to the selected store having the product for presentation on the customer's mobile station. The IVR or the website server would be configured to offer the store navigation feature and if chosen by the customer to send the place message to CCES (analogous to step S4), after which the operation would be quite similar to that described above relative to FIGS. 1 and 2.

Those skilled in the art presumably are familiar with the structure, programming and operations of the various types of mobile stations. However, for completeness, it may be useful to consider the functional elements/aspects of an exemplary mobile station, at a high-level.

For purposes of such a discussion, FIG. 3 provides a block diagram illustration of an exemplary mobile station 13. Although the mobile station 13 may be a smart-phone or may be incorporated into another device, such as a personal digital assistant (PDA) or the like, for discussion purposes, the illustration shows the mobile station 13 is in the form of a handset. The handset embodiment of the mobile station 13 functions as a normal digital wireless telephone station. For that function, the mobile station 13 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 13 also includes at least one digital transceiver (XCVR) 108. Today, the mobile station 13 would be configured for digital wireless communications using one or more of the common network technology types. The concepts discussed here encompass embodiments of the mobile station 13 utilizing any digital transceivers that conform to current or future developed digital wireless communication standards. The mobile station 13 may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13a and the communication network. The data services here include communications through the Internet, for example, those with the navigation ASP server. Each transceiver 108 connects through RF send and receive amplifiers (not separately shown) to an antenna 110. The transceiver may also support various types of mobile messaging services, such SMS, enhanced messaging service (EMS) and/or multimedia messaging service (MMS).

The mobile station 13 includes a display 118 for displaying messages, menus or the like, call related information dialed by the user, calling party numbers. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during navigation. For example, the user might activate keys of keypad 120 for appropriate user inputs, e.g. to select turn by turn navigation from the place message when shown on the display 118. The display 118 and/or the speaker 104 may be used to provide the actual presentation of the directions to the customer via the mobile station 13, as the customer navigates to the store.

The wireless device 101 also includes a GPS receiver 113. The GPS receiver 113 may be used to identify the location of the wireless device 101 in real time as the customer travels about.

A microprocessor 112 serves as a programmable controller for the mobile station 13, in that it controls all operations of the mobile station 13 in accord with programming that it executes, for all normal operations, and for operations involved in enabling the procedure under consideration here. In the example, the mobile station 13 includes flash type program memory 114, for storage of various "software" or "firmware" program routines and mobile configuration settings, such as mobile directory number (MDN) and/or mobile identification number (MN), etc. The mobile station 13 may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memory 114 also stores the navigation client application which enables turn-by-turn navigation via communication with the GPS receiver 113 and the navigation ASP server 25. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 13 includes a processor, and programming stored in the flash memory 114 configures the processor so that the mobile station is capable of performing various desired functions, including in this case the functions involved in the technique for providing turn-by-turn navigation directions to one or more stores carrying a desired product.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of automatically providing directions on a mobile station of a customer, for example, to the location of a store that has a desired product may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the to automatically providing directions on a mobile station of a customer at a first store to the location of a second store that has a desired product not available in the first store as shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method, comprising steps of:
    receiving an input of a product selection of a customer via a point of sale terminal in a first store;
    responsive to the product selection, searching an inventory management system to identify one or more stores having the selected product in stock;
    selecting a second store from among the one or more identified stores;
    sending a place message, relating to location of the second store, for a mobile station of the customer;
    responsive to the place message, causing a navigation client application on the mobile station of the customer to obtain information regarding the location of the selected second store via a mobile communication network, by requesting a system of a navigation service provider to send a wake-up message through the mobile communication network to the mobile station, the mobile station causing the navigation client to wake up in response to the wake-up message; and
    providing directions for the customer from a current location of the mobile station of the customer to the location of the selected second store, for presentation to the customer, via the navigation client application and a user interface of the mobile station.

2. The method of claim 1, wherein upon wake-up, the navigation client application causes the mobile station to communicate through the mobile communication network with the system of the navigation service provider to obtain the place message.

3. The method of claim 2, wherein the step of providing directions includes steps of:
    determining the current location of the mobile station of the customer;
    communicating the current location of the mobile station of the customer through the mobile communication network to the system of the navigation service provider;
    receiving the directions from the current location of the mobile station of the customer to the location of the selected second store, through the mobile communication network, from the system of the navigation service provider; and
    presenting the received directions to the customer via the user interface of the mobile station.

4. The method of claim 3, wherein:
    the one or more stores include stores offering products for use with the mobile communication network; and
    the customer is at least one of a user or a subscriber to services of the mobile communication network.

5. The method of claim 4, wherein the selected product is another mobile station.

6. An article of manufacture comprising programming for implementing the steps of the method of claim 1 and at least one non-transitory machine readable medium bearing the programming.

7. A system, including a mobile communication network, the system comprising:
    at least one processing device; and
    at least one memory storing executable instructions for causing the at least one processing device to:
    receive an input of a product selection of a customer via a point of sale terminal in a first store;
    responsive to the product selection, search an inventory management system to identify one or more stores having the selected product in stock;
    receive an input of selection of a second store from among the one or more identified stores;
    send a place message, relating to location of the second store, for a mobile station of the customer;
    responsive to the place message, cause a navigation client application on the mobile station of the customer to obtain information regarding the location of the selected second store via the mobile communication network, by requesting a system of a navigation service provider to send a wake-up message through the mobile communication network to the mobile station, the mobile station causing the navigation client application to wake up in response to the wake-up message; and
    provide directions for the customer from a current location of the mobile station of the customer to the location of the selected second store, for presentation to the customer, via the navigation client application and a user interface of the mobile station.

8. The system of claim 7, further comprising the navigation client application, wherein upon wake-up, the navigation client application causes the mobile station to communicate through the mobile communication network with the system of the navigation service provider to obtain the place message.

9. The system of claim 8, wherein the navigation client application comprises executable instructions for causing the mobile station to:
    determine the current location of the mobile station of the customer;
    communicate the current location of the mobile station of the customer through the mobile communication network to the system of the navigation service provider;
    receive the directions from the current location of the mobile station of the customer to the location of the selected second store, through the mobile communication network, from the system of the navigation service provider; and
    present the received directions to the customer via the user interface of the mobile station.

10. The system of claim 9, wherein:
    the one or more stores include stores offering products for use with the mobile communication network; and
    the customer is at least one of a user or a subscriber to services of the mobile communication network.

11. The system of claim 10, wherein the selected product is another mobile station.

12. A method, comprising steps of:
receiving an input of a product selection of a customer;
responsive to the product selection, searching an inventory management system to identify one or more stores having the selected product in stock;
selecting a store from among the one or more identified stores;
sending a place message, relating to location of the selected store, for a mobile station of the customer;
responsive to the place message, causing a navigation client application on the mobile station of the customer to obtain information regarding the location of the selected store via a mobile communication network, by requesting a system of a navigation service provider to send a wake-up message through the mobile communication network to the mobile station, the mobile station causing the navigation client application to wake up in response to the wake-up message; and
communicating directions for the customer from a current location of the mobile station of the customer to the location of the selected second store to the navigation client application, for presentation to the customer a user interface of the mobile station.

13. The method of claim 12, wherein the step of receiving the input of the product selection comprises receiving the customer input at one of: a point of sale terminal in another store, an interactive voice response system and a website server.

14. The method of claim 12, wherein the step of communicating the directions includes steps of:
determining the current location of the mobile station of the customer; and
sending the directions from the current location of the mobile station of the customer to the location of the selected second store, through the mobile communication network, from the system of the navigation service provider, for presentation to the customer via the user interface of the mobile station.

15. The method of claim 12, wherein:
the one or more stores include stores offering products for use with the mobile communication network; and
the customer is at least one of a user or a subscriber to services of the mobile communication network.

16. The method of claim 15, wherein the selected product is another mobile station.

17. An article of manufacture comprising programming for implementing the steps of the method of claim 12 and at least one non-transitory machine readable medium bearing the programming.

* * * * *